Figure 1:
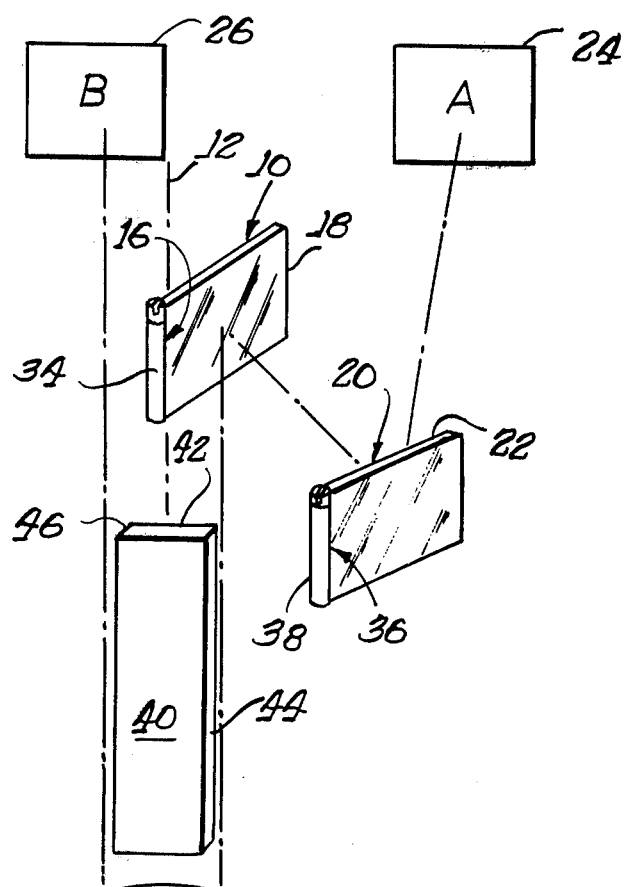

United States Patent [19]

Williams

[11] 4,288,819
[45] Sep. 8, 1981

[54] MULTI-FIELD IMAGING DEVICE

[76] Inventor: Robert T. Williams, 404 South Ardmore, Villa Park, Ill.

[21] Appl. No.: 37,836

[22] Filed: May 10, 1979

[51] Int. Cl.³ .................. H04N 5/25; G02B 27/10
[52] U.S. Cl. ..................... 358/226; 350/171; 354/117
[58] Field of Search ............. 358/226, 88; 350/171, 350/169, 172, 173, 174; 354/117, 122, ; 358/108

[56] References Cited

U.S. PATENT DOCUMENTS

| | | | |
|---|---|---|---|
| 1,655,850 | 1/1928 | Watts . | |
| 2,299,002 | 10/1942 | Austin | 95/18 |
| 2,314,174 | 3/1943 | Steinman . | |
| 2,413,996 | 1/1947 | Ramsdell | 95/13 |
| 3,547,513 | 12/1970 | Sheimer | 350/30 |
| 3,612,764 | 10/1971 | Gilkeson | 358/108 |
| 3,997,723 | 12/1976 | Sandim | 358/226 |
| 4,167,756 | 9/1979 | Smith | 350/174 |

*Primary Examiner*—Robert L. Richardson
*Assistant Examiner*—Edward L. Coles
*Attorney, Agent, or Firm*—Fitch, Even, Tabin, Flannery & Welsh

[57] ABSTRACT

A multi-field imaging device is described for directing light from a first optical field and a separated second optical field into a video camera used for security surveillance thereby reproducing a split-screen image with the video camera. The multi-field imaging device can be aligned whereby light from the second optical field is directed directly onto one side of an image plane. A pair of mirrors are adjusted so that light from the first optical field is reflected by the mirrors to the image plane in a juxtaposed relation with the light from the second optical field. The image plane is positioned a predetermined distance from a lens of the video camera whereby images directed on the image plane are reproduced by the video camera.

5 Claims, 2 Drawing Figures

U.S. Patent  Sep. 8, 1981  4,288,819

MULTI-FIELD IMAGING DEVICE

This invention relates to security surveillance systems and, more particulary, to a multi-field imaging device for directing light from a pair of separated optical fields into a video camera used for security surveillance thereby reproducing a split-screen image with the video camera.

Under certain circumstances, it is desirable to produce an image of two widely separated areas or optical fields in a juxtaposed relationship. Such a result may be desired, for example, in the case of a closed circuit television system for use for security surveillance. Sweeping the video camera between two separated areas to be surveyed is typically undesirable because not only does the image frequently become blurred due to lack of proper focus, but it is possible to miss the observance of a given event in a particular area when the video camera is not trained on that area.

In order to circumvent the foregoing problems, closed circuit television systems have been designed which reproduce juxtaposed images of the two separated areas electronically. Electronic systems for accomplishing this purpose, however, are often complex and relatively expensive. Moreover, electronic systems do not typically allow the use of varying focal length lenses for increasing or decreasing the magnification of the subjects in the areas of interest.

For economical reasons and to allow the use of varying focal length lenses, optical systems have been designed which are comprised entirely of optical components. These optical systems often comprise two pairs of mirrors which reflect light from a pair of separated optical fields toward an image plane in a juxtaposed relationship. The image plane is positioned a predetermined distance from a lens of a video camera whereby the images directed on the image plane are reproduced by the video camera. However, optical systems of this design have several problems. Firstly, when mirrors are used in an optical system there is a loss of resolution because of the light lost due to the reflection off of the mirrors. This loss of resolution increases as the number of mirrors used in the system increases. For the totally optical system comprising two pairs of mirrors the loss of light must be compensated for by using a more expensive lens for the video camera having a larger aperture which greatly increases the total cost of the system.

Further as the number of mirrors used in the optical system increases it becomes increasingly more difficult to set up and align the reflected light from the respective optical fields onto the image plane. For example, with two pairs of mirrors the optical system is aligned in a trial and error process by repeating the following steps until an acceptable result is obtained: focusing the video camera toward a point approximately between the separated optical fields, adjusting one of the pairs of mirrors to image one of the optical fields onto half of a viewing area of the video camera, and adjusting the other pair of mirrors to image the other optical field onto the other half of the viewing area in a juxtaposed relationship. Due to the criticality of these adjustments, the procedure for setting up this optical system is very time consuming and difficult to effectuate.

Accordingly, it is an object of the present invention to provide an improved multi-field imaging device for directing light from a pair of separated optical fields into a video camera used for security surveillance thereby reproducing a split-screen image with the video camera.

Another object of the invention is to provide an improved multi-field imaging device of the type described which is entirely optical in its configuration.

Yet, another object of the invention is to provide an improved multi-field imaging device of the type described which is low in cost and readily adaptable to existing equipment.

Another object of the invention is to provide an improved multi-field imaging device of the type described which allows the use of a less expensive video camera lens having a smaller aperture.

Still another object of the invention is to provide an improved multi-field imaging device of the type described which minimize the number of mirrors used in the system to reflect light from the separated optical fields onto the image plane.

Another object of the invention is to provide an improved multi-field imaging device of the type described which has the capability of aligning light from the separated optical fields onto the image plane with little difficulty.

Figure 2:
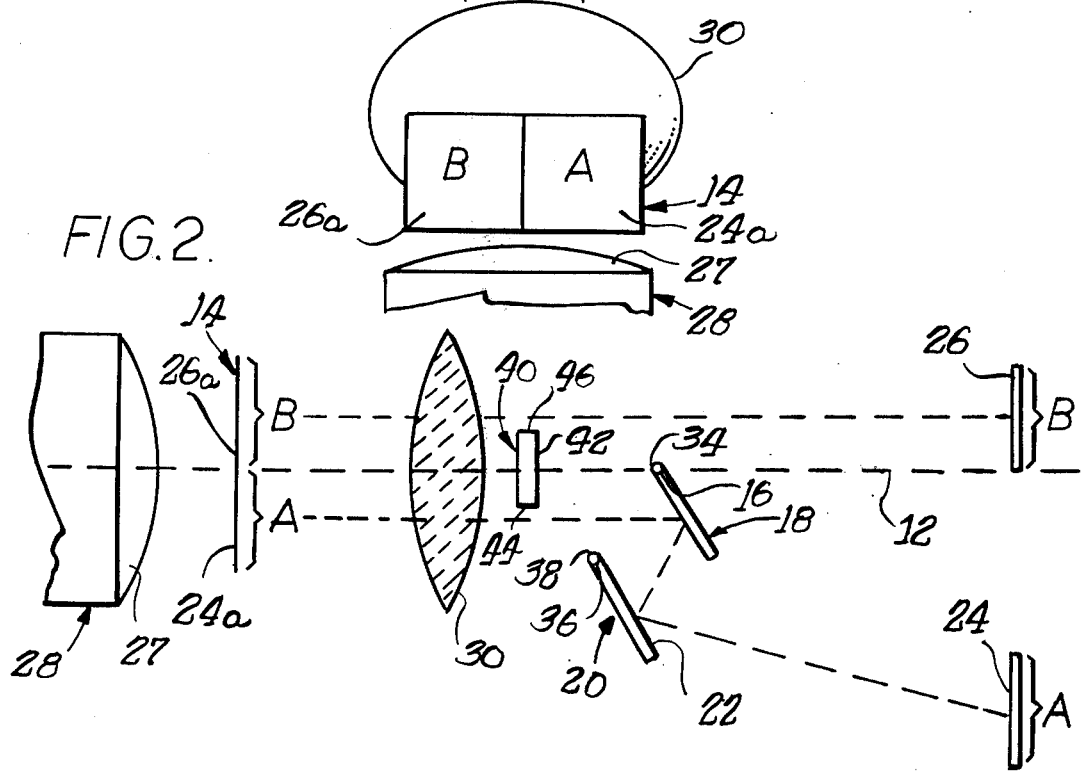

Other objects of the invention in addition to those set forth above will become apparent to those skilled in the art from the following description, taken in connection with the accompanying drawings wherein:

FIG. 1 is a perspective view, in schematic form, of a device constructed in accordance with the preset invention; and FIG. 2 is a plan schematic view of the device of FIG. 1 illustrating additional elements.

This invention is directed to a multi-field imaging device for directing light from a first optical field and a separated second optical field into a video camera used for security surveillance thereby reproducing a split-screen image with the video camera. Very generally, the device of the present invention comprises a first mirror 10 positioned on one side of an optical axis 12 which intersects an image plane 14. The first mirror 10 has an edge 16 adjacent to the optical axis 12 and has a reflecting surface 18 oriented toward the image plane 14. A second mirror 20 is provided spaced from the first mirror 10 and on the same side of the optical axis 12 as the first mirror 10. The second mirror 20 has a reflecting surface 22 oriented to reflect light from a first optical field 24. The device of the present invention can be aligned whereby light rejected by the first mirror 10 from first optical field 24 and light directly from a second optical field 26 are projected to the image plane 14 in a juxtaposed relationship, shown as projected first and second optical fields 24a and 26a. Means are provided for positioning the image plane 14 a predetermined distance from a lens 27 of a video camera 28 whereby images directed on the image plane 14 are reproducable by the video camera 28.

Referring now more particularly to the drawings, the device illustrated therein may be used in conjunction with the video camera 28, of which only the lens 27 is shown. In video systems of the prior art, the so-called split-screen effect (i.e., two distinct images each occupying a portion of the total picture area) is accomplished either by using two cameras and an electrical combiner, or by using two sets of mirrors to reflect light from the separated optical fields to the video camera. Such arrangements have disadvantages such as those pointed out above.

The device of the present invention produces a split-screen or a side-by-side image in the image plane 14. The video camera 28 is adjusted so that the image plane 14 is in focus, and thereby will reproduce whatever is imaged in the image plane 14.

The video camera 28 and a lens 30 are preferably positioned on the optical axis 12 of the device of the present invention. The lens 30 is merely representative, and any number of lenses, mirrors or other optical devices may be utilized to constitute a lens system or means for providing the desired imaging effect.

Basically, the purpose of the device is to juxtapose the images of a pair of separated subjects or optical fields, represented by the letters A and B and respectively numbered 24 and 26 in the drawings. In a closed circuit television surveillance system, it may be desired to survey areas represented by the optical fields 24 and 26. By juxtaposing and imaging the two optical fields 24 and 26 in the image plane 14, the video camera 28 may reproduce a split-screen image for the person monitoring the closed circuit system.

The first mirror 10, in the illustrated embodiment, is rectangular in shape. The edge 16 of the first mirror 10 is mounted on a pivot post 34 which is adjacent the optical axis 12. The reflecting surface of the first mirror 10 is oriented toward the image plane 14, with the mirror 10 disposed at about a 45° angle to the optical axis 12. The size of the first mirror 10 and the angle of its disposition is precisely selected to center the image at the image plane 14, and to fill the desired field in the image plane 14 according to the field of view of the video camera 28.

The second mirror 20 is spaced from the first mirror 10 on the same side of the optical axis 12 as the first mirror 10. The second mirror 20 in the illustrated embodiment, is also rectangular in shape with an edge 36 mounted on a pivot post 38. The axis of the pivot posts 34 and 38 are parallel. The first mirror 10 and the second mirror 20 are adjusted about the pivot posts 34 and 38 in order to center the first image plane 24 on half of the image plane 14.

To juxtapose and image the first and second optical fields 24 and 26 in the image plane 14, the multi-field imaging device is set up in the following manner. The image plane 14 is aligned toward the second optical field 26 whereby light from the second optical field 26 is imaged onto the portion of image plane 14 designated in the figure by the projected second optical field 26a. Then the first and second mirrors 10 and 20 are pivoted about the pivotal posts 34 and 40 so that light from the first optical field 24 is reflected off of the first and second mirrors 10 and 20 to the portion of the image plane 14 designated in the figures by the projected first optical field 24a in a juxtaposed relationship with the projected second optical field 26a. It is noted that the procedure for aligning the optical device containing only a single pair of mirrors is much simpler and less time consuming than the procedure for aligning a comparable optical device containing two pairs of mirrors.

In order to sharply define the line between the first and second optical fields 24 and 26 when imaged onto the image plane 14, an opaque rectangularly shaped mask 40 is used which in the illustrated embodiment is placed between the lens 30 and the pivot post 34 slightly closer to the lens 30. A broad face 42 of the mask 40 is perpendicular to the optical axis 12, with the optical axis 12 passing through its center. Parallel edges 44 of the broad face 42 are parallel to the pivotal post 34 and are as least as long as the diameter of the lens 30. Parallel edges 46 of the broad face 42 have lengths which are approximately one third of the diameter of the lens 30. The mask 40 is placed in this location to produce a distinct line of demarcation between the images as viewed by the video camera 28.

It is noted that the device of the present invention is of significantly lower cost than traditional dual camera-electronic combining split-screen techniques. A device constructed in accordance with the invention may be easily attached to the front of a video camera or other type of camera device. Positioning of the fields is readily effected by proper adjustment of the first mirror 10 and the second mirror 20. The device is suitable for use with long focal length lenses in the video camera 28 to increase the size of the subjects in the first and second optical fields 24 and 26. This could, for example, be desirable in the cases of security surveillance systems where it is desirable to increase the head sizes of subjects within the optical fields under surveillance.

More importantly, the device of the present invention is a totally optical system of improved design which overcomes some of the problems experienced by the traditional optical systems which use two pairs of mirrors to reflect light from separated optical fields towards the video camera. More particularly, the device of the present invention allows the use of a standard lens for the video camera whereas a more expensive specialty lens is necessary with a traditional optical system which uses two pairs of mirrors. Depending upon the sensitivity of a video camera a minimal amount of light must pass through the lens of the video camera in order for an image to be reproduced by the video camera. The amount of light which passes through the lens depends on the size of the aperture of the lens, which is equivalent to the ration of the lens diameter to the focal length. Its reciprocal is called the f-number. The smaller the f-number, the more light that passes through the lens. Video cameras generally use standard ready available f 1.8 lenses (that is with an f-number of 1.8). However, when a traditional optical system is attached to the video camera there is a loss of intensity of light which enters the lens of the video camera because of the light loss due to the reflection off of the two pairs of mirrors. To use a traditional optical system with a video camera would require the use of a lens having a larger aperture to compensate for the lower level of light which is directed to the lens by the mirrors, say an f 1.3 lens. However, f 1.3 lenses are a specialty item which must generally be hand polished due to their large size and are therefore very expensive. In fact, using an f 1.3 lens can easily destroy the economy of using the traditional totally optical system.

In contrast, the device of the present invention uses only a single pair of mirrors in conjunction with an inexpensive focusing lens. The total amount of light which reaches the lens of the video camera is greater than the amount that would reach the lens of the video camera if a traditional optical system having two pairs of mirrors were used. It has been determined that for a video camera of standard sensitivity the increase in the total light which reaches the lens of the camera allows the use of a standard f 1.8 lens instead of the more expensive f 1.3 lens. Therefore, a substantial savings is realized using the present invention which utilizes only a single pair of mirrors instead of two pairs of mirrors.

Further, because of the improved design of the device of the present invention, it is much easier to set up and align the separated optical fields onto the image plane. The alignment procedure for the traditional optical system is time consuming and difficult to effectuate. In contrast it is much easier to align the separated optical fields onto the image plane with the device of the present invention.

It may therefore be seen that the invention provides an improved multi-field imaging device for directing light from a pair of separated optical fields into a video camera used for security surveillance thereby reproducing a split-screen image with the video camera. The device is lower in cost than typical prior art systems, easier to set up and adjust, and offers high degree of versatility in use.

It should be understood that although certain preferred embodiments of the present invention have been illustrated and described, various modifications, alternatives and equivalents thereof will become apparent to those skilled in the art and, accordingly, the scope of the present invention should be defined only by the appended claims and equivalents thereof.

Various features of the invention are set forth in the following claims.

What is claimed is:

1. A multi-field imaging device for directing light from a first optical field and a separated second optical field into a video camera used for security surveillance thereby reproducing a split-screen image with the video camera, the multi-field imaging device comprising: means for positioning an image plane a predetermined distance from a lens of the video camera whereby images directed on the image plane are reproduced by the video camera; a first mirror positioned on one side of an optical axis which intersects the image plane, the first mirror having an edge adjacent to the optical axis and having a reflective surface oriented toward the image plane; a second mirror having a reflecting surface oriented to reflect light from the first optical field to the first mirror, the multi-field imaging device can be aligned so that light reflected by the first mirror from the first optical field and light from the second optical field are projected to the image plane in a juxtaposed relationship and can therefore be reproduced with the video camera; lens means positioned between the first mirror and the imaging plane for focusing images of the first optical field and the separated second optical field in the image plane; and a mask located between the lens means and the first mirror and aligned approximately along the optical axis for producing a distinct line of demarcation between the images as reproduced by the video camera.

2. A multi-field imaging device according to claim 1 wherein the second mirror is pivotal.

3. A multi-field imaging device according to claim 1 wherein the lens of the video camera has a minimum f-number greater than or equal to about 1.8.

4. A multi-field imaging device according to claim 2 wherein the first mirror is pivotal.

5. The device of claim 4 wherein the first mirror is pivotal about the one side located nearest the optical axis.

* * * * *